(12) United States Patent
Guan (10) Patent No.: US 8,202,466 B2
(45) Date of Patent: Jun. 19, 2012

(54) MAKING PROCESS OF AN INTEGRALLY PLASTIC OUTLET PIPE

(75) Inventor: Bichang Guan, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 254 days.

(21) Appl. No.: 12/690,428

(22) Filed: Jan. 20, 2010

(65) Prior Publication Data
US 2011/0177273 A1  Jul. 21, 2011

(51) Int. Cl.
  B29C 45/00   (2006.01)
  B29C 65/00   (2006.01)
  B29B 7/00    (2006.01)
  B28B 5/00    (2006.01)
  B29C 47/00   (2006.01)
  F16L 9/00    (2006.01)
  F16L 11/00   (2006.01)

(52) U.S. Cl. ............... 264/328.8; 264/248; 264/250; 428/36.9; 138/109

(58) Field of Classification Search .................. None
See application file for complete search history.

(56) References Cited

U.S. PATENT DOCUMENTS

| | | | | | |
|---|---|---|---|---|---|
| 4,869,616 | A | * | 9/1989 | Linnemeier | 403/270 |
| 5,413,743 | A | * | 5/1995 | Prophet | 264/1.7 |
| 6,042,364 | A | * | 3/2000 | Nishida | 425/574 |
| 6,117,380 | A | * | 9/2000 | Shirai et al. | 264/250 |
| 6,210,619 | B1 | * | 4/2001 | Owens | 264/255 |
| 6,365,083 | B1 | * | 4/2002 | Nishida | 264/255 |
| 6,372,170 | B1 | * | 4/2002 | Nishida et al. | 264/255 |
| 6,428,730 | B1 | * | 8/2002 | Nishida | 264/255 |
| 6,579,486 | B1 | * | 6/2003 | Nakajima et al. | 264/255 |
| 6,604,500 | B2 | * | 8/2003 | Miyahara et al. | 123/184.61 |
| 6,981,860 | B2 | * | 1/2006 | Takemoto et al. | 425/116 |
| 7,097,439 | B2 | * | 8/2006 | Koyama et al. | 425/112 |
| 7,144,537 | B2 | * | 12/2006 | Tustin et al. | 264/255 |
| 7,147,816 | B2 | * | 12/2006 | Nishida | 264/255 |
| 7,291,302 | B2 | * | 11/2007 | Koyama et al. | 264/255 |
| 7,575,704 | B2 | * | 8/2009 | Nishida | 264/248 |
| 7,588,809 | B2 | * | 9/2009 | Nishida | 428/35.7 |
| 7,604,764 | B2 | * | 10/2009 | Arai et al. | 264/263 |
| 7,744,361 | B2 | * | 6/2010 | Nishida | 425/116 |
| 7,824,173 | B2 | * | 11/2010 | Nishida | 425/508 |
| 7,837,460 | B2 | * | 11/2010 | Nishida | 425/395 |
| 7,855,494 | B2 | * | 12/2010 | Umezawa | 313/113 |
| 7,879,277 | B2 | * | 2/2011 | Nishida | 264/250 |
| 7,971,565 | B2 | * | 7/2011 | Catton et al. | 123/184.61 |
| 2011/0177273 | A1 | * | 7/2011 | Guan | 428/36.9 |
| 2011/0186146 | A1 | * | 8/2011 | Guan | 137/315.01 |

* cited by examiner

*Primary Examiner* — Christina Johnson
*Assistant Examiner* — Benjamin Schiffman (57) ABSTRACT

An integrally plastic outlet pipe and making process thereof includes the steps of: a. preparing a mold; b. mold closing at the first opposite position; c. injection molding a semi-finished first part member; d. opening mold to take out a semi-finished upper cover of the wasted second part member; e. mold closing at a second opposite position; f. hot pressing a finished outlet pipe of a third part member and injection molding the semi-finished first part member and the semi-finished upper cover of the second part member; g. mold opening to obtain a finished integrally plastic outlet pipe of the third part member; h. mold closing at the first opposite position again; i. hot pressing the finished outlet pipe and rejection molding the semi-finished first part member and the semi-finished upper cover of the second part member; j. opening mold to acquire a finished integrally plastic outlet pipe.

8 Claims, 8 Drawing Sheets

MAKING PROCESS OF AN INTEGRALLY PLASTIC OUTLET PIPE

BACKGROUND OF THE INVENTION

1. Field of the Invention

The present invention relates to an integrally plastic outlet pipe and making process thereof used in a body of a tap.

2. Description of the Prior Art

Conventional outlet pipe of a tap is made of cooper material with lead substances and is worked by a complex mechanical working method. To avoid lead pollution, the outlet pipe is washed to eliminate lead substance, and the inlet connector and the spray nozzle are pre-formed and then welded together manually, hence making the conventional outlet pipe at a high cost and a poor efficiency.

The present invention has arisen to mitigate and/or obviate the afore-described disadvantages.

SUMMARY OF THE INVENTION

The primary object of the present invention is to provide an integrally plastic outlet pipe and making process thereof which is capable of overcoming the shortcomings of the conventional plastic outlet pipe and making process thereof.

A further object of the present invention is to provide an integrally plastic outlet pipe and making process thereof which allows to produce the integrally plastic outlet pipe at quick time and lower cost to enhance product yield.

Another object of the present invention is to provide an integrally plastic outlet pipe and making process thereof which can prevent lead pollution.

Also another object of the present invention is to provide an integrally plastic outlet pipe and making process thereof which can enhance connecting strength and closing effect, obtaining good quality and prolong service life.

A making process of an integrally plastic outlet pipe in accordance with a preferred embodiment of the present invention comprises:

a. preparing a mold, the mold including a first and a second plate members to be mold closed or opened together, wherein the first plate member includes a first groove, a first cavity, a second die block, a third cavity, and a second groove formed on a first forming surface thereof; and the second plate member includes a first die block, a second cavity, a third cavity, and a fourth die block formed on a second forming surface thereof, when the second plate member is located at a first opposite position, the first die block, the second cavity, the third cavity, and the fourth die block of the second plate member are opposite to the first cavity, the second die block, the third cavity, and the second groove of the first plate member, and when the second plate member is located at a second opposite position, the first die block, the second cavity, the third cavity, and the fourth die block of the second plate member are opposite to the first groove, the first cavity, the second die block, and the third cavity of the first plate member;

b. limiting the first and the second plate members to be located at the first opposite position to mold close the first and the second plate members with each other;

c. injection molding a semi-finished first part member to the second cavity of the second plate member, and injection molding a semi-finished second part member to the first cavity of the first plate member, wherein the first part member includes a semi-housing, an inlet connector connected to one end of the semi-housing, and a spray nozzle coupled to another end of the semi-housing; the inlet connector includes a first hole formed therein to communicate with one end thereof relative to the first semi-wall, includes a first intake defined on a free end thereof, and includes a first outer coupling surface formed on an inner side thereof relative to the semi-housing; the spray nozzle includes a second hole arranged therein to communicate with the first semi-wall, includes a first outlet defined on a free end thereof, and includes a second outer coupling surface mounted on an inner side thereof relative to the semi-housing; the second part member is a semi-housing and includes an arcuate second semi-wall extending thereon, includes two second connecting fringes disposed on an outer periphery of the second semi-wall, includes a first inner coupling surface and a second inner coupling surface arranged on two ends thereof respectively;

d. opening the first and the second plate members to take out a pre-formed second part member from the first cavity of the first plate member;

e. limiting the first and the second plate members at the second opposite position to close the first and the second plate members together;

f. hot pressing a pre-formed first part member in the second cavity of the second plate member and the pre-formed second part member in the first cavity of the first plate member together to form a finished outlet pipe of a third part member and injection molding the semi-finished first part member to the third cavity of the second plate member and the semi-finished second part member to the third cavity of the first plate member, wherein the second connecting fringes of the second part member and the first connecting fringes of the first part member are hot pressed to melt together, and the first inner coupling surface and the second inner coupling surface are hot pressed with the first outer coupling surface and the second outer coupling surface of the first part member to be melted together;

g. opening the first and the second plate members to take out a finished third part member from the first cavity of the first plate member and the second cavity of the second plate member;

h. returning the first and the second plate members the first opposite position to be closed together;

i. hot pressing the pre-formed first part member in the third cavity of the second plate member and the pre-formed second part member in the third cavity of the first plate member together to form the finished third part member; meanwhile, the semi-finished first part member being injection molded in the second cavity of the second plate member, and the semi-finished second part member being injection molded in the first cavity of the first plate member;

j. opening the first and the second plate members to take the third part member from the third cavity of the first plate member and the third cavity of the second plate member;

k. repeating the steps of e to j to obtain the finished third part member.

A integrally plastic outlet pipe made by the making process in accordance with a preferred embodiment of the present invention comprises:

a tube portion including an inflow end, an outflow end, and a channel between the inflow end and the outflow end;

a connector portion integrally connected to the inflow end of the tube portion, and including a bore to communicate with the channel, and the bore including a second intake defined on a free end thereof; the connector portion being assembled to a spout of a tap, and the second intake communicating with the spout of the tap;

a nozzle portion integrally coupled to the outflow end of the tube portion, and including an orifice communicating with the channel, and the orifice including a second outlet defined on a free end thereof;

wherein the channel is formed in an arc shape;

wherein the bore is linear;

wherein the orifice is formed in a cone shape;

wherein a side rim of the bore connects with an inner rim of the channel of the tube portion, and the orifice communicates with the channel of the tube portion at a predetermined curved angle and includes a cutout formed thereon;

wherein the connector portion also includes two annular indentions arranged on an outer side rim proximate to a free end thereof to receive a waterproof pad, and includes two symmetrical retaining members integrally formed on an inner side of the indentions to retain with the spout of the tap;

wherein the nozzle portion also includes outer threads integrally formed on an outer rim thereof to screw with a watering member;

wherein the watering member is a wave generator; and wherein the watering member is an extending hose.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
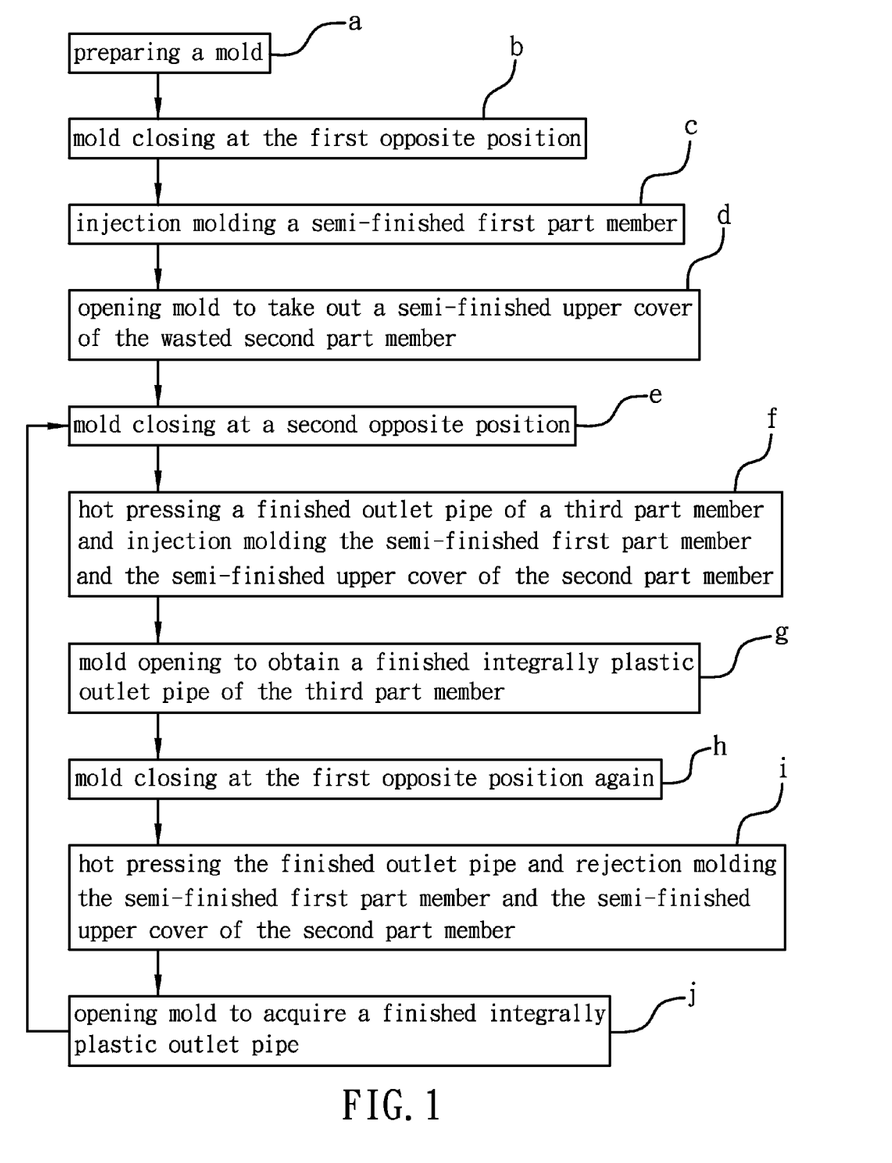
FIG. 1 is a flow chart showing the making process of an integrally plastic outlet pipe in accordance with a preferred embodiment of the present invention.
Figure 2:
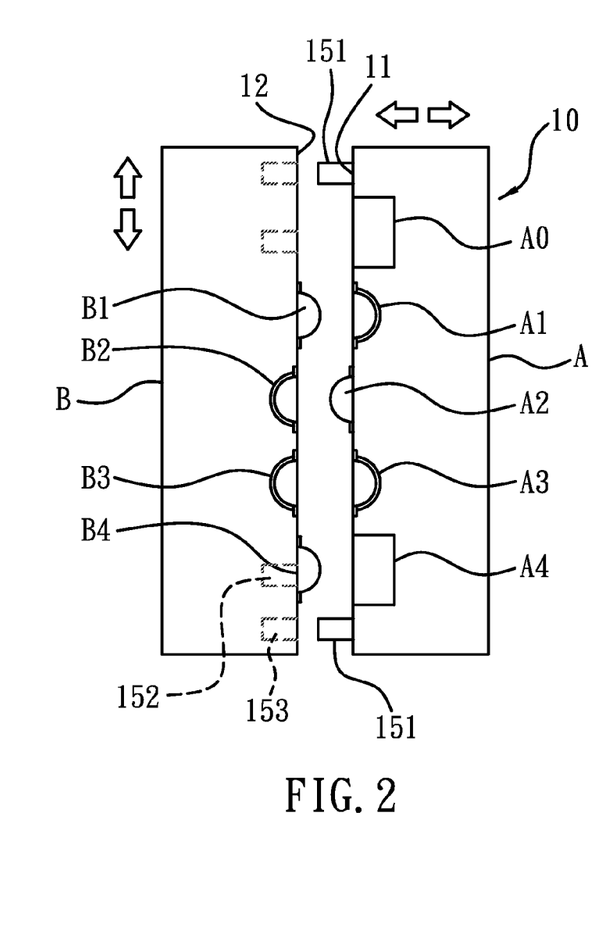
FIG. 2 is a cross sectional view showing the operation of a first and a second plate members in accordance with the preferred embodiment of the present invention.
Figure 3:
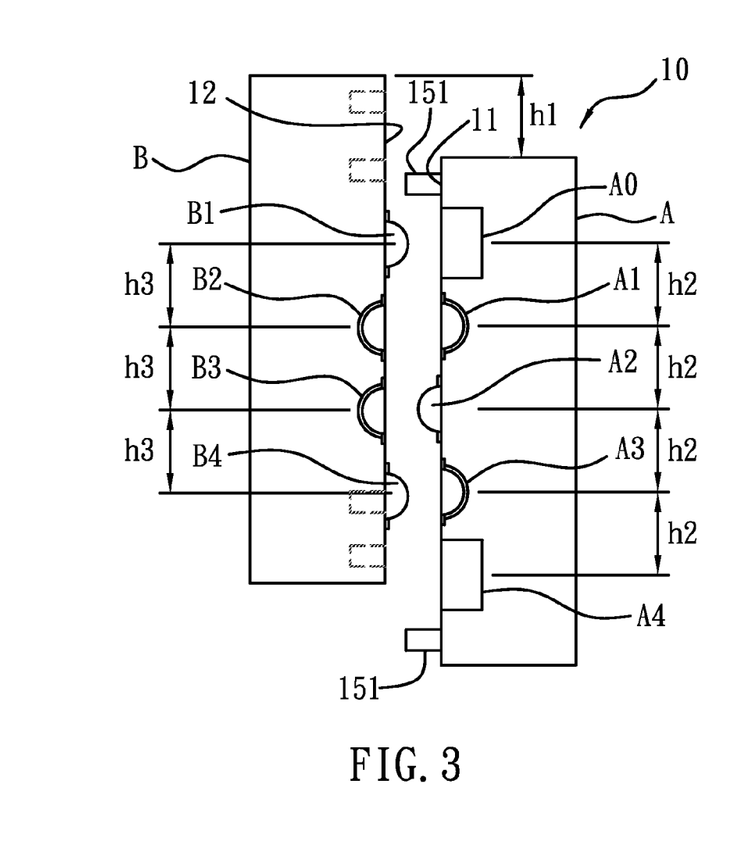
FIG. 3 is a cross sectional view showing the second plate member being moved upward to a second opposite position in accordance with the preferred embodiment of the present invention.

Referring to FIGS. 1 and 2, an integrally plastic outlet pipe and making process thereof according to a preferred embodiment of the present invention comprises the steps of:

a. preparing a mold, the mold 10 including a first and a second plate members to be mold closed or opened together, wherein a front mold plate A is the first plate member, and a rear mold plate B is a second plate member; the front mold plate A includes a first groove A0, a first cavity A1, a second die block A2, a third cavity A3, and a second groove A4 formed on a first forming surface 11 thereof; and the rear mold plate B includes a first die block B1, a second cavity B2, a third cavity B3, and a fourth die block B4 formed on a second forming surface 12 thereof; when the rear mold plate B is located at a first opposite position where the rear mold plate B aligns with the front mold plate A, the first die block B1, the second cavity B2, the third cavity B3, and the fourth die block B4 of the rear mold plate B are opposite to the first cavity A1, the second die block A2, the third cavity A3, and the second groove A4 of the front mold plate A, and when the rear mold plate B is located at a second opposite position where the rear mold plate B is moved upward to be higher than a predetermined height distance h1 as shown in FIG. 3, the first die block B1, the second cavity B2, the third cavity B3, and the fourth die block B4 of the rear mold plate B are opposite to the first groove A0, the first cavity A1, the second die block A2, and the third cavity A3.

b. mold closing at the first opposite position, where the front and the rear mold plates A, B are limited at the first opposite position to be mold closed with each other;

c. injection molding a semi-finished first part member, wherein the semi-finished first part member 20 is injection molded to the second cavity B2, and a semi-finished second part member 30 is injection molded to the first cavity A1 of the front mold plate A, the first part member 20 is used in the following making process, and the second part member 30 is a wasted product without being used in the following making process.

Figure 4:
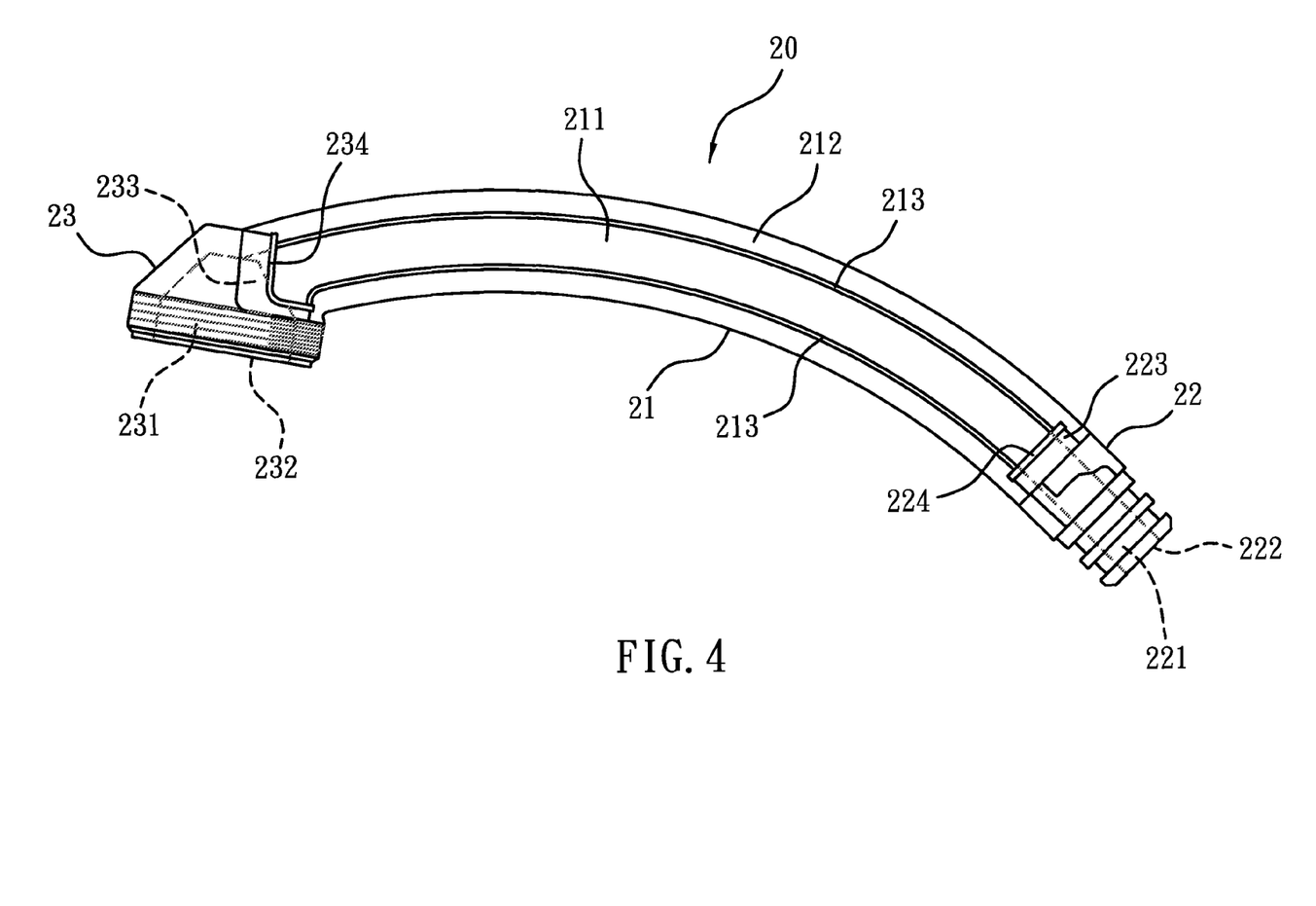
FIG. 4 is a cross sectional view showing the assembly of a semi-finished first part member in accordance with the preferred embodiment of the present invention.
Figure 5:
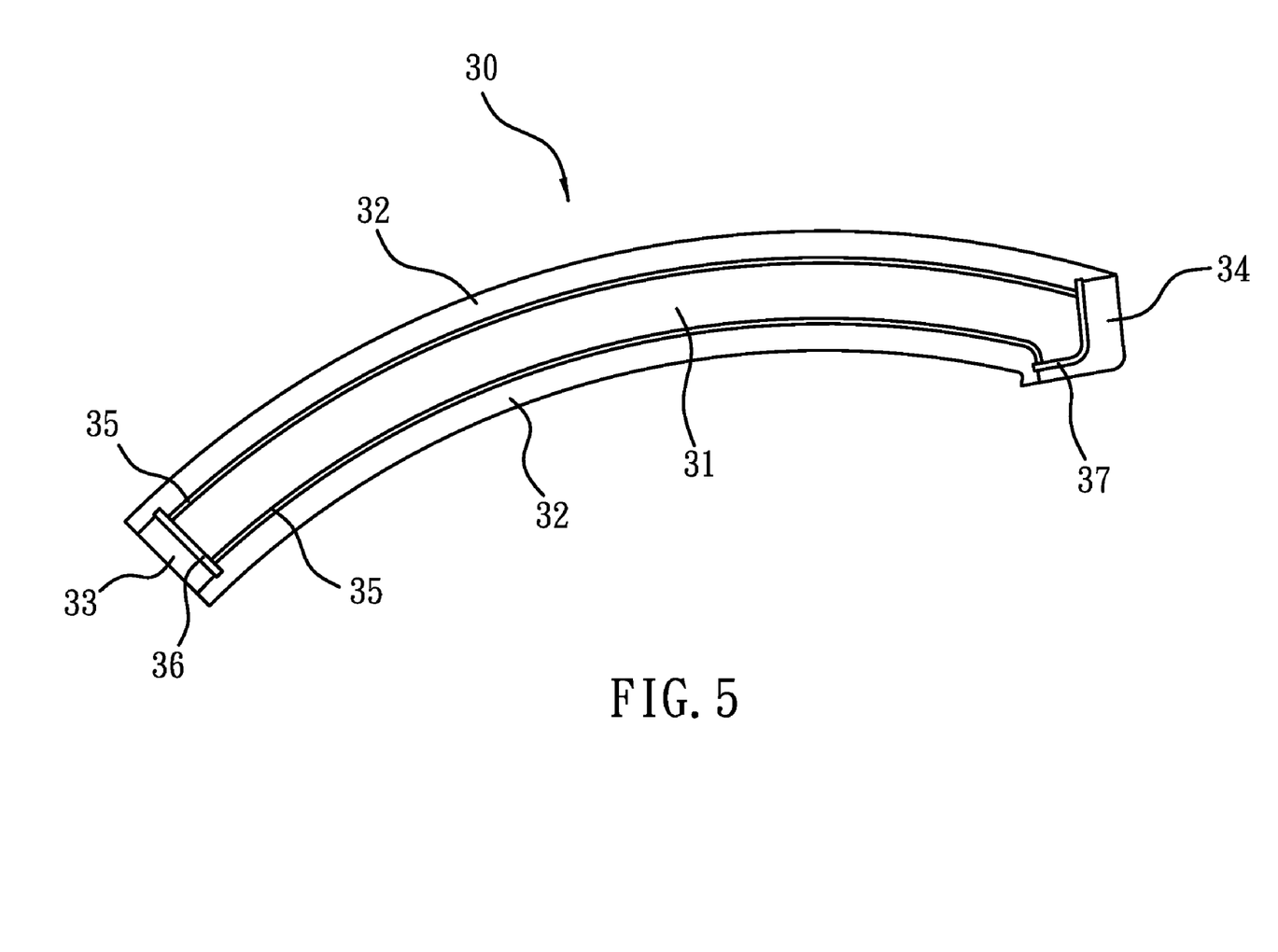
FIG. 5 is a cross sectional view showing the assembly of a semi-finished upper cover of a second part member in accordance with the preferred embodiment of the present invention.
Figure 6:
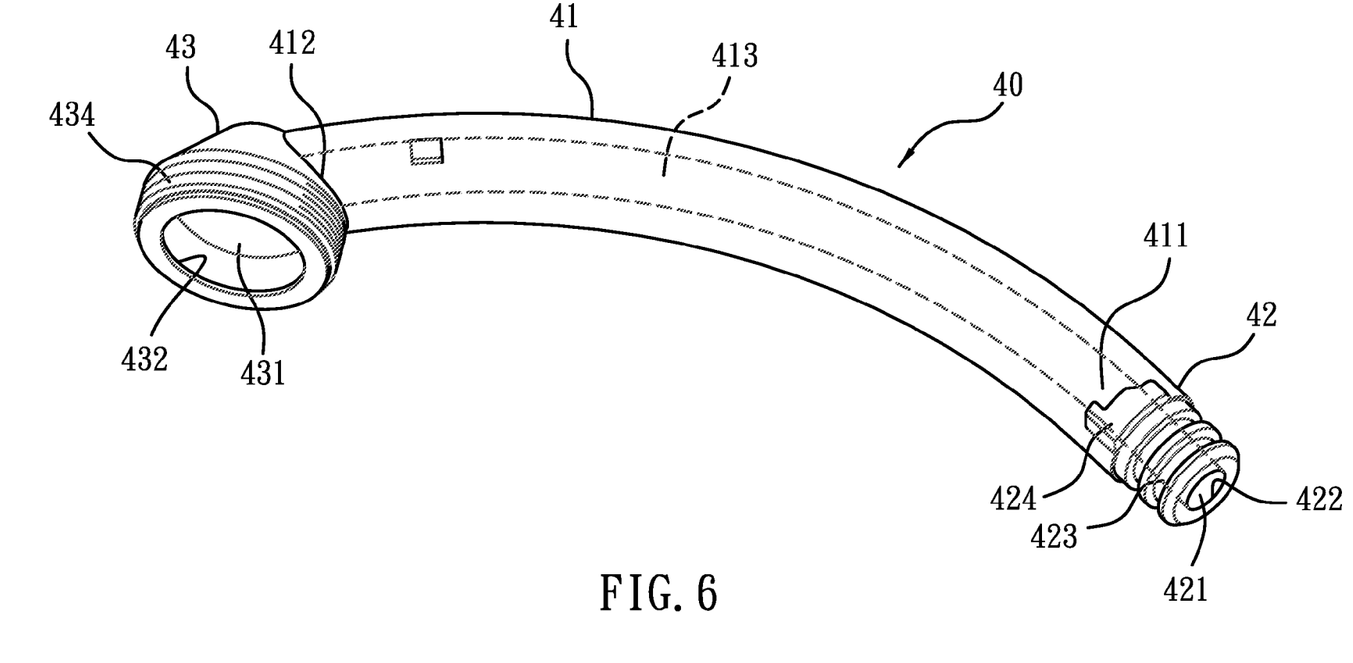
FIG. 6 is a perspective view showing a finished integrally plastic outlet pipe of a third part member in accordance with the preferred embodiment of the present invention.

As shown in FIG. 4, the first part member 20 includes a semi-housing 21, an inlet connector 22 connected to one end of the semi-housing 21, an outlet connector 23, and a spray nozzle 23 coupled to another end of the semi-housing 21; the semi-housing 21 includes an arcuate first semi-wall 211 extending thereon, includes two first connecting fringes 212 disposed on an outer periphery of the first semi-wall 211, and a cross section of the first semi-wall 211 is formed in a concaved arc shape; the inlet connector 22 includes a first hole 221 formed therein to communicate with one end thereof relative to the first semi-wall 211, includes a first intake 222 defined on a free end thereof, and includes a first outer coupling surface 223 formed on an inner side thereof relative to the semi-housing 21; the spray nozzle 23 includes a second hole 231 arranged therein to communicate with the first semi-wall 211, includes a first outlet 232 defined on a free end thereof, and includes a L-shaped second outer coupling surface 233 mounted on an inner side thereof relative to the semi-housing 21. As illustrated in FIG. 5, the second part member 30 is a semi-housing and includes an arcuate second semi-wall 31 extending thereon, includes two second connecting fringes 32 disposed on an outer periphery of the second semi-wall 31, includes a first inner coupling surface 33 and a L-shaped second inner coupling surface 34 arranged on two ends thereof respectively, wherein a cross section of the second semi-wall 31 is formed in a concave arc shape.

d. opening mold to take out a semi-finished upper cover of the wasted second part member 30, wherein the front and the rear mold plates A, B are opened and a pre-formed second part member 30 is taken out from the first cavity A1 of the front mold plate A.

e. mold closing at a second opposite position, wherein the front and the rear mold plates A, B are limited at the second opposite position as shown in FIG. 3, and then the front and the rear mold plates A, B are closed together.

f. hot pressing a finished outlet pipe of a third part member and injection molding the semi-finished first part member and the semi-finished upper cover of the second part member, wherein the pre-formed first part member 20 in the second cavity B2 of the rear mold plate B and the pre-formed second part member 30 in the first cavity A1 of the front mold plate A are hot pressed together to form an integrally plastic outlet pipe 40 of the third part member as shown in FIG. 6. In the meantime, the first part member 20 is rejection molded in the third cavity B3 of the rear mold plate B, and the second part member 30 is injection molded in the third cavity A3 of the front mold plate A.

It is to be noted that during the first and the second part members 20, 30 are hot pressed together, the second connecting fringes 32 of the second part member 30 and the first connecting fringes 212 of the first part member 20 are melted together, and the first inner coupling surface 33 and the second inner coupling surface 34 are hot pressed with the first outer coupling surface 223 and the second outer coupling surface 233 of the first part member 20 to be melted together, thus reinforcing a connecting strength. To enhance closing effect, the first semi-wall 211 of the first part member 20 includes a projected strap 213 fixed on a side rim thereof relative to the first connecting fringe 212 as shown in FIG. 4, and the first outer coupling surface 223 includes a first rib 224 formed on a rim thereof relative to the first semi-wall 211. Likewise, the second outer coupling surface 233 includes a second rib 234 formed on a rim thereof in relation to the first semi-wall 211. Also, the second part member 30 includes two stepped slots 35 disposed on side peripheries of the second semi-wall 31 relative to the two second connecting fringes 32 individually as illustrated in FIG. 5, and includes a first recess 36 mounted on a side end of the first inner coupling surface 33 relative to the second semi-wall 31, and includes a second recess 37 fixed on a side periphery of the second inner coupling surface 34 in relation to the second semi-wall 31, such that when the first and the second part members 20, 30 are hot pressed to melt together, the straps 213 are hot pressed to retain with the stepped slots 35, and the first and the second ribs 224, 234 are hot pressed to retain with the first and the second recesses 36, 37 to enhance connecting strength and closing effect around the first and the second semi-walls 211, 31, thus preventing water from leak.

g. mold opening to obtain a finished integrally plastic outlet pipe of the third part member, wherein the front and the rear mold plates A, B are opened to take out a finished third part member (e.g., the integrally plastic outlet pipe) from the first cavity A1 of the front mold plate A and the second cavity B2 of the rear mold plate B.

h. mold closing at the first opposite position again, wherein the front and the rear molds A, B are returned to the first opposite position to be closed together.

i. hot pressing the finished outlet pipe of the third part member and rejection molding the semi-finished first part member and the semi-finished upper cover of the second part member, wherein the pre-formed first part member 20 in the third cavity B3 of the rear mold plate B and the pre-formed second part member 30 in the third cavity A3 of the front mold plate A are hot pressed together to form a finished integrally plastic outlet pipe 40 of the third part member; meanwhile, the first part member 20 is injection molded in the second cavity B2 of the rear mold plate B, and the second part member 30 is injection molded in the first cavity A1 of the front mold plate A.

j. opening mold to acquire a finished integrally plastic outlet pipe of the third part member, wherein the front and the rear mold plates A, B are opened to take the third part member from the third cavity A3 of the front mold plate A and the third cavity B3 of the rear mold plate B, acquiring the finished integrally plastic outlet pipe 40; and repeating the steps of e to j, the finished integrally plastic outlet pipe 40 of the third part member, the semi-finished first part member 20, and the semi-finished upper cover of the second part member 30 are obtained.

The finished integrally plastic outlet pipe 40 can be taken out by using a mechanical arm so as to produce the integrally plastic outlet pipe automatically except for taking the semi-finished upper cover of the second part member 30 manually outward.

Except for one of the semi-finished upper covers of the second part member 30 obtained in the first mold opening process and one of the semi-finished first part member 20 obtained in the last mold opening process are a wasted product, other semi-finished products are used completely to lower material consumption.

Figure 7:
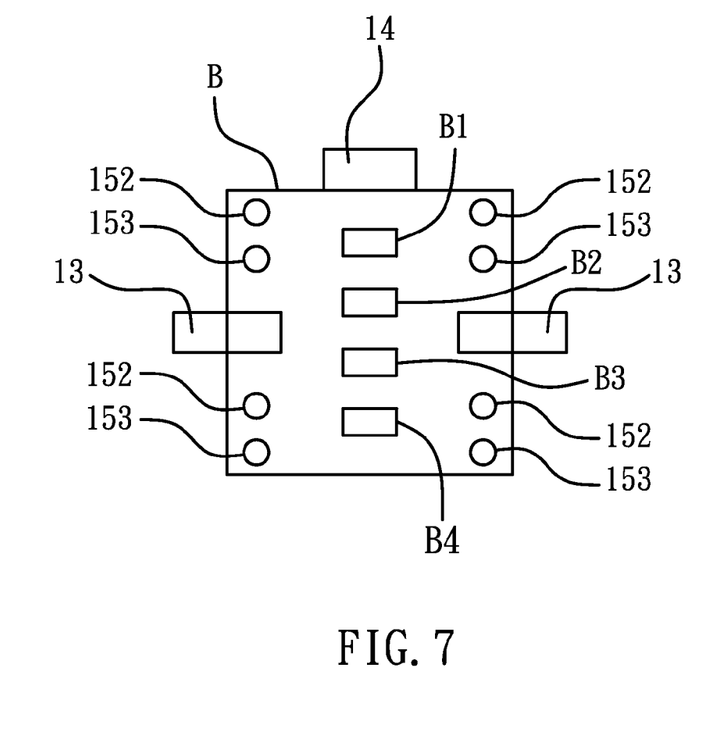
FIG. 7 is a plan view showing the assembly of first and second apertures, cores, and a hydraulic cylinder in accordance with the preferred embodiment of the present invention.
Figure 8:
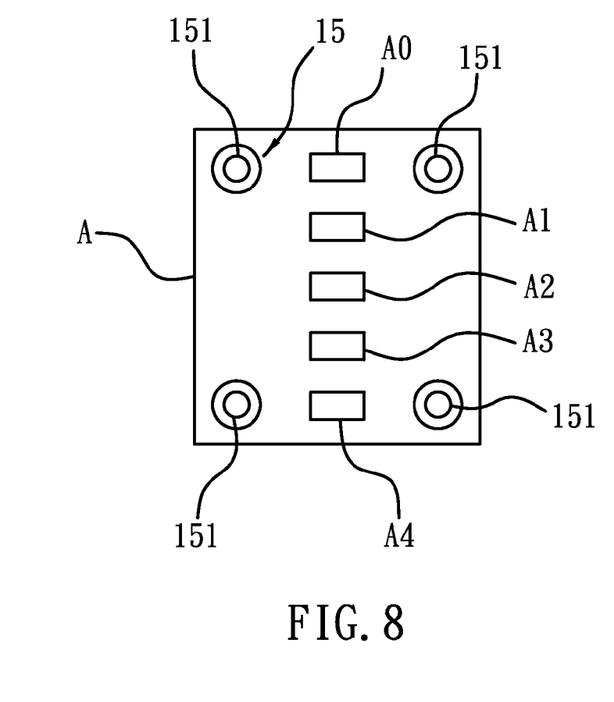
FIG. 8 is a plan view showing the pillars in accordance with the preferred embodiment of the present invention.

Referring to FIG. 7, when the first part member 20 is injection molded, a core 13 is pulled to move so as to match with the front and the rear mold plates A, B to injection mold the inlet connectors 22 of the two ends of the first part member 20 and first and second holes 221, 231 of the spray nozzle 23. The core 13 is designed to be movable so that after the first and the second part members 20, 30 are hot pressed together, they are able to be removed by pulling the core 13. Because these structures are well-known, further remarks are omitted hereafter.

The front and the rear mold plates A and B are controlled to exchange at the first and the second opposite oppositions freely, and the controlling methods includes moving the rear mold plate B upward and downward, but the front mold plate A allows to be moved upward and downward as well. To move the rear mold plate B upward and downward smoothly, a slidable device associated with a hydraulic cylinder 14 is applied as shown in FIG. 7, the slidable device is comprised of a sliding member and a sliding trench. For example, the rear mold plate B includes at least one slidable member and at least one sliding trench fixed on a base which is used to slide the rear mold plate B so that the rear mold plate is actuated by the hydraulic cylinder 14, and the sliding member slides upward and downward along the sliding trench of the base. In this embodiment, the hydraulic cylinder 14 is installed on an upper side where the rear mold plate B moves upward. Of course, the hydraulic cylinder 14 can be installed on a lower side where the rear mold plate B move downward as well.

When the front and the rear mold plates A, B are located at the first opposite position as illustrated in FIG. 1, they are in alignment with each other, and when the front and the rear mold plates A, B are changed to the second opposite positions as shown in FIG. 3, e.g., the rear mold plate B is actuated to move to the first height distance h1, and the first die block B1 of the rear mold plate B relative to the first cavity A1 of the front mold plate A is moved to a height position relative to the first groove A0 of the front mold plate A. Likewise, the second cavity B2 of the rear mold plate B relative to the second die block A2 of the front mold plate A is moved to another height position in relation to the first cavity A1 of the front mold plate A. Thereby, if a second height distance h2 between central positions of the first groove A0, the first cavity A1, the second die block A2, the third dir block A3, and the second groove A4, and a third height distance h3 between central positions of the first die block B1, the second cavity B2, the third cavity B3, and the fourth dir block 4 are set to be equal to the first height distance h1 so that the cavities are in alignment with the die blocks.

With reference to FIGS. 2 and 3, to open and close the front and the rear mold plates smoothly, a guiding device 15 is installed between the front and the rear mold plates to guide the front and the rear mold plates to open and close, and includes four pillars 151 disposed on the front mold plate A, and includes four first apertures 152 and four second apertures 153 mounted on the rear mold plate B. When the front and the rear mold plates A, B are located at the first opposite position, the four pillars 151 of the front mold plate A are aligned with the four first apertures 152 of the rear mold plate B so that the four pillars 151 and the four first apertures 152 engage with each other. When the front and the rear mold plates A, B are at the second opposite positions, the four pillars 151 of the front mold plate A are in alignment with the second apertures 153 of the rear mold plate B to obtain precise aligning and guiding effects.

The integrally plastic outlet pipe 40 is injection molded from mixed material made of nylon and glass fiber to enhance structural strength.

Figure 9:
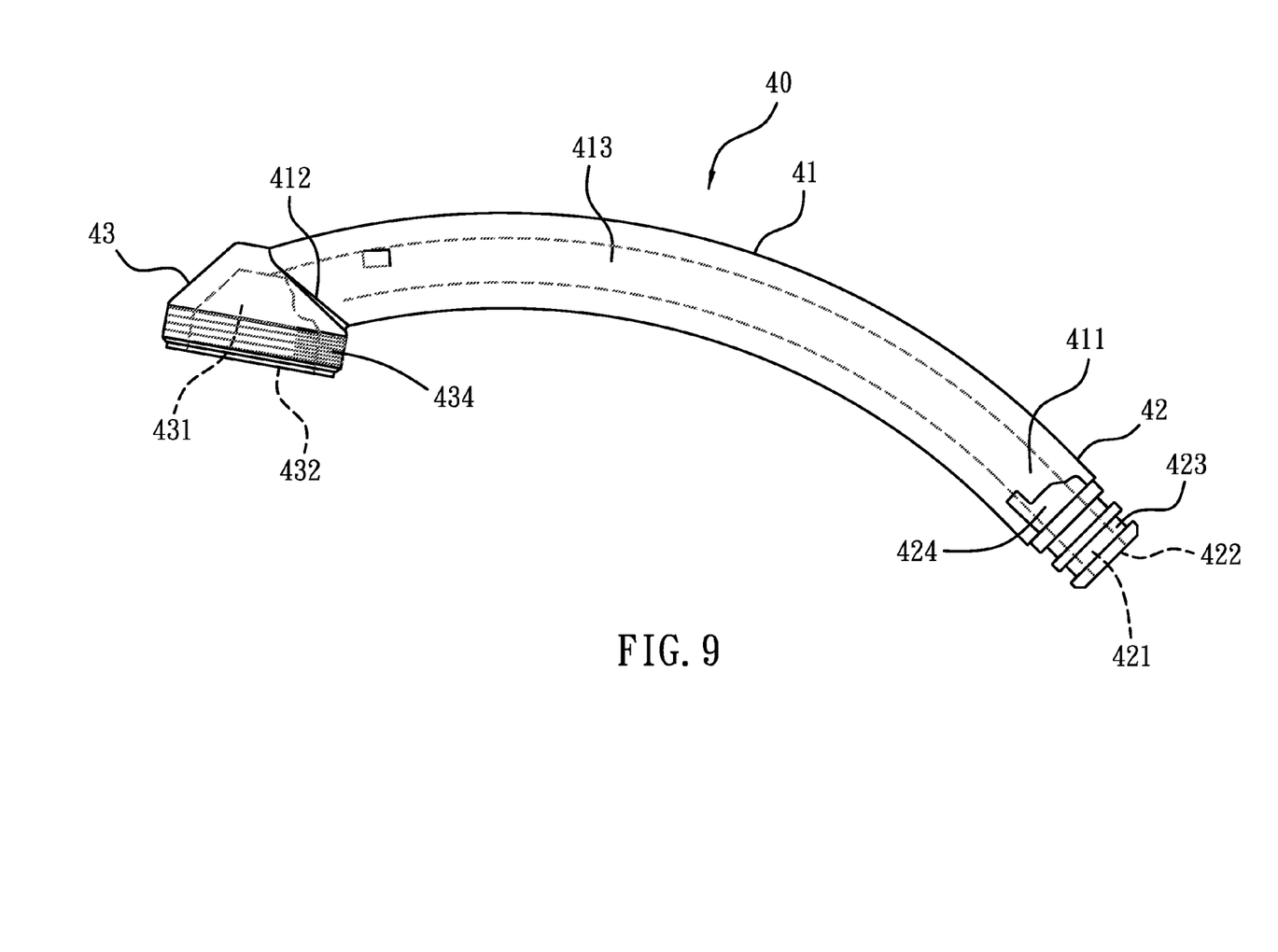
FIG. 9 is a plan view showing a finished integrally plastic outlet pipe of a third past member in accordance with the preferred embodiment of the present invention.
Figure 10:
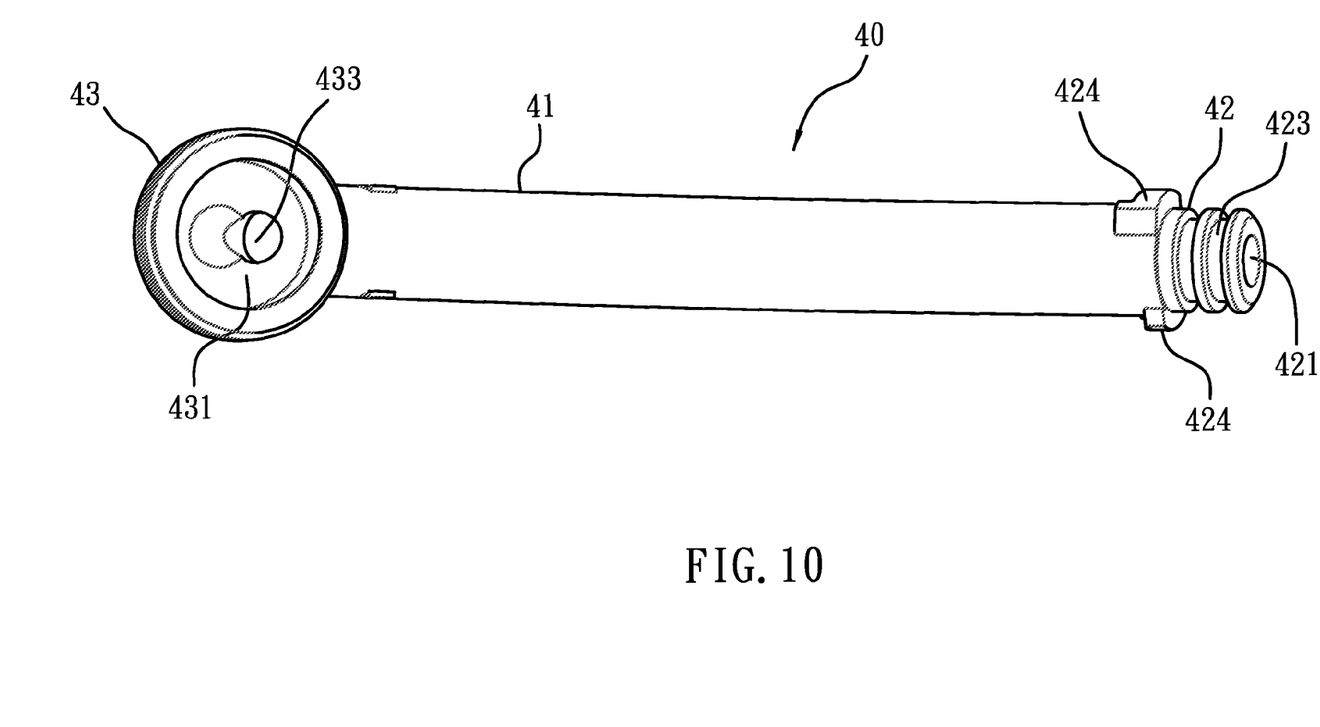
FIG. 10 is another perspective view showing a finished integrally plastic outlet pipe of a third past member in accordance with the preferred embodiment of the present invention.

The making process of the integrally plastic outlet pipe allows to produce the leadless integrally plastic outlet pipe 40 as shown in FIGS. 6, 9, and 10, and includes a tube portion 41, a connector portion 42, a nozzle portion 43, wherein the tube portion 41 includes an inflow end 411, an outflow end 412, and a channel 413 between the inflow end 411 and the outflow end 412, and the channel 413 is formed in an arc shape.

The connector portion 42 is integrally connected to the inflow end 411 of the tube portion 41, and includes a bore 421 to communicate with the channel 413, and the bore 421 includes a second intake 422 defined on a free end thereof. The connector portion 42 is assembled to a spout of a tap, and the second intake 422 communicates with the spout of the tap. The bore 421 is linear and its side rim connects with an inner rim of the channel 413 of the tube portion 41.

The connector portion 42 includes two annular indentions 423 arranged on an outer side rim proximate to a free end thereof to receive a waterproof pad, and includes two symmetrical retaining members 424 integrally formed on an inner side of the indentions 423 to retain with the spout of the tap, thereby having a closing effect to prevent water from leak.

The nozzle portion 43 is integrally coupled to the outflow end 412 of the tube portion 41, and includes an orifice 431 communicating with the channel 413, and the orifice 431 includes a second outlet 432 defined on a free end thereof; the orifice 431 is formed in a cone shape to communicate with the channel 413 of the tube portion 41 at a predetermined curved angle. In this embodiment, the curved angle is about 110 degrees, and the orifice 431 includes a cutout 433 formed thereon.

The nozzle portion 43 includes outer threads 434 integrally formed on an outer rim thereof to screw with a watering member, and the watering member is a wave generator or an extending hose.

The indentions 423 and the retaining members 424 of the connector portion 42 and the outer threads 434 of the nozzle portion 43 are pre-formed by ways of the semi-finished first part member 20. The slidable die block moving with the rear mold plate B is used to align the semi-finished first part member 20 and the semi-finished upper cover of the second part member 30 with the relative cavities precisely during hot pressing process. In other words, the inlet connector 22 and the outlet connector 23 of the first part member 20 are mold closed by using the slidable die block, and when the semi-finished first part member 20 and the semi-finished upper cover of the second part member 30 are hot pressed, the slidable die block and the relative cavities of the front mold plate A are mold closed so as to prevent the pre-formed indentions 423, the retaining members 424, and the outer threads 434 of the semi-finished first part member 20 from being damaged by the relative cavities of the front mold plate A, and the slidable die block are mold opened after the finished third part member 40 is formed and before the front and the rear mold plates are mold opened so that the finished third part member 40 is taken out, thus keeping the finished third part member 40 at a certain quality and yield rate, and the slidable die block allows to match with the movable core 13 as well.

While we have shown and described various embodiments in accordance with the present invention, it is clear to those skilled in the art that further embodiments may be made without departing from the scope of the present invention.

What is claimed is:

1. A making process of an integrally plastic outlet pipe comprising the steps of:
   a. preparing a mold, the mold including a first and a second plate members to be mold closed or opened together, wherein the first plate member includes a first groove, a first cavity, a second die block, a third cavity, and a second groove formed on a first forming surface thereof; and the second plate member includes a first die block, a second cavity, a third cavity, and a fourth die block formed on a second forming surface thereof, when the second plate member is located at a first opposite position, the first die block, the second cavity, the third cavity, and the fourth die block of the second plate member are opposite to the first cavity, the second die block, the third cavity, and the second groove of the first plate member, and when the second plate member is located at a second opposite position, the first die block, the second cavity, the third cavity, and the fourth die block of the second plate member are opposite to the first groove, the first cavity, the second die block, and the third cavity of the first plate member;
   b. limiting the first and the second plate members to be located at the first opposite position to mold close the first and the second plate members with each other;
   c. injection molding a semi-finished first part member to the second cavity of the second plate member, and injection molding a semi-finished second part member to the first cavity of the first plate member, wherein the first part member includes a semi-housing, an inlet connector connected to one end of the semi-housing, and a spray nozzle coupled to another end of the semi-housing; the inlet connector includes a first hole formed therein to communicate with one end thereof relative to the first semi-wall, includes a first intake defined on a free end thereof, and includes a first outer coupling surface formed on an inner side thereof relative to the semi-housing; the spray nozzle includes a second hole arranged therein to communicate with the first semi-wall, includes a first outlet defined on a free end thereof, and includes a second outer coupling surface mounted on an inner side thereof relative to the semi-housing; the second part member is a semi-housing and includes an arcuate second semi-wall extending thereon, includes two second connecting fringes disposed on an outer periphery of the second semi-wall, includes a first inner coupling surface and a second inner coupling surface arranged on two ends thereof respectively;

d. opening the first and the second plate members to take out a pre-formed second part member from the first cavity of the first plate member;

e. limiting the first and the second plate members at the second opposite position to close the first and the second plate members together;

f. hot pressing a pre-formed first part member in the second cavity of the second plate member and the pre-formed second part member in the first cavity of the first plate member together to form a finished outlet pipe of a third part member and injection molding the semi-finished first part member to the third cavity of the second plate member and the semi-finished second part member to the third cavity of the first plate member, wherein the second connecting fringes of the second part member and the first connecting fringes of the first part member are hot pressed to melt together, and the first inner coupling surface and the second inner coupling surface are hot pressed with the first outer coupling surface and the second outer coupling surface of the first part member to be melted together;

g. opening the first and the second plate members to take out a finished third part member from the first cavity of the first plate member and the second cavity of the second plate member;

h. returning the first and the second plate members the first opposite position to be closed together;

i. hot pressing the pre-formed first part member in the third cavity of the second plate member and the pre-formed second part member in the third cavity of the first plate member together to form the finished third part member; meanwhile, the semi-finished first part member being injection molded in the second cavity of the second plate member, and the semi-finished second part member being injection molded in the first cavity of the first plate member;

j. opening the first and the second plate members to take the third part member from the third cavity of the first plate member and the third cavity of the second plate member;

k. repeating the steps of e to j to obtain the finished third part member.

2. The making process of the integrally plastic outlet pipe as claimed in claim 1, wherein the first hole of the inlet connector and the second hole of the spray nozzle are formed by pulling a core.

3. The making process of the integrally plastic outlet pipe as claimed in claim 1, wherein the first and the second plate members are controlled to exchange at the first and the second opposite oppositions by moving the second plate member upward and downward.

4. The making process of the integrally plastic outlet pipe as claimed in claim 3 further comprising a base, between the base and the second plate member being defined a slidable device comprised of a sliding member and a sliding trench so that the second plate member is actuated by a hydraulic cylinder, and the sliding member slides upward and downward along the sliding trench of the base.

5. The making process of the integrally plastic outlet pipe as claimed in claim 1, wherein between the first and the second plate members is installed a guiding device to guide the first and the second plate members to open and close.

6. The making process of the integrally plastic outlet pipe as claimed in claim 5, wherein the guiding device includes four pillars disposed on the first plate member, and includes four first apertures and four second apertures mounted on the second plate member; when the first and the second plate members are located at the first opposite position, the four pillars of the first plate member are aligned with the four first apertures of the second plate member so that the four pillars and the four first apertures engage with each other; when the first and the second plate members are at the second opposite positions, the four pillars of the first plate member are in alignment with the second apertures of the second plate member to obtain precise aligning and guiding effects.

7. The making process of the integrally plastic outlet pipe as claimed in claim 1, wherein the first semi-wall of the first part member includes a projected strap fixed on a side rim thereof relative to the first connecting fringe, and the first outer coupling surface includes a first rib formed on a rim thereof relative to the first semi-wall; the second outer coupling surface includes a second rib formed on a rim thereof in relation to the first semi-wall; the second part member includes two stepped slots disposed on side peripheries of the second semi-wall relative to the two second connecting fringes individually, and includes a first recess mounted on a side end of the first inner coupling surface relative to the second semi-wall, and includes a second recess fixed on a side periphery of the second inner coupling surface in relation to the second semi-wall, such that when the first and the second part members are hot pressed to melt together, the straps are hot pressed to retain with the stepped slots, and the first and the second ribs are hot pressed to retain with the first and the second recesses.

8. The making process of the integrally plastic outlet pipe as claimed in claim 1, wherein the finished third part member is taken out by using a mechanical arm.

* * * * *